March 10, 1942. H. BANY 2,275,881
FAULT PROTECTIVE SYSTEM
Filed Oct. 31, 1939
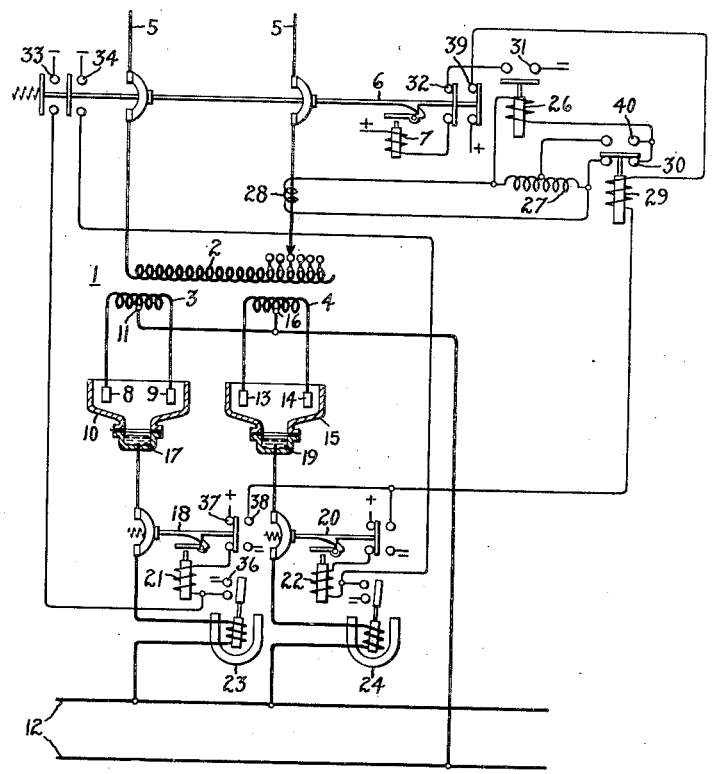
Inventor:
Herman Bany,
by Harry E. Dunham
His Attorney.

Patented Mar. 10, 1942

2,275,881

UNITED STATES PATENT OFFICE 2,275,881

FAULT PROTECTIVE SYSTEM

Herman Bany, Lansdowne, Pa., assignor to General Electric Company, a corporation of New York Application October 31, 1939, Serial No. 302,180

11 Claims. (Cl. 175—363)

My invention relates to fault protective systems and particularly to a system for protecting parallel connected electroresponsive translating devices, such as power rectifiers, against faults which, under certain operating conditions, may produce a fault current which is less than the normal full load current of the parallel connected translating devices, and one object of my invention is to provide a fault protective system for parallel connected translating devices which will protect the devices under all operating conditions.

My invention will be better understood from the following description when taken in connection with the accompanying drawing the single figure of which diagrammatically illustrates a fault protective system for two parallel connected power rectifiers supplied by the same power transformer and its scope will be pointed out in the appended claims.

Referring to the drawing, 1 represents a power transformer having a primary winding 2 and two secondary windings 3 and 4. The primary winding 2 is arranged to be connected to a suitable alternating current supply circuit 5 by means of a circuit breaker 6 shown as a manually closed latched-in circuit breaker having a trip coil 7 which, when energized, effects the opening of the circuit breaker. The end terminals of the secondary winding 3 of the power transformer 1 are respectively connected to the anodes 8 and 9 of a power rectifier 10 which may be of any well known type, and the mid terminal 11 of the secondary winding 3 is connected to one side of a direct current load circuit 12. Similarly, the end terminals of the secondary winding 4 of the power transformer 1 are respectively connected to the anodes 13 and 14 of a power rectifier 15, and the mid terminal 16 of the secondary winding 4 is connected to the same side of the load circuit 12 that the mid terminal 11 of the secondary winding 3 is connected. The cathode 17 of the rectifier 10 is connected to the other side of the direct current load circuit 12 through a suitable circuit breaker 18, and the cathode 19 of the rectifier 15 is connected to the same side of the load circuit 12 through a suitable circuit breaker 20. The circuit breakers 18 and 20 are respectively provided with trip coils 21 and 22 the circuits of which are arranged to be completed respectively by the reverse current relays 23 and 24 when current flows from the direct current load circuit 12 to the associated rectifiers.

For varying the voltage of the direct current load circuit over a wide range, the primary winding 2 of the power transformer 1 is provided with a number of taps so that the number of turns connected across the supply circuit 5 can be varied to change the voltage applied to the rectifiers 10 and 15.

For effecting the opening of the circuit breaker 6, I provide an overcurrent relay 26 which, when the current through its winding exceeds a predetermined value, completes an energizing circuit for the trip coil 7. In accordance with my invention, I provide an arrangement whereby the ratio between the current supplied to the overcurrent relay 26 and the current supplied to the primary winding 2 of the transformer 1 is inversely proportional to the number of rectifiers connected to the direct current load circuit 12. In the particular embodiment of my invention shown, this result is obtained by connecting an autotransformer 27 across the secondary winding of the current transformer 28, the primary winding of which is connected in series with the primary winding 2 of the power transformer 1 and connecting the winding of the overcurrent relay 26 in parallel with the entire winding of the autotransformer 27 when both of the rectifiers 10 and 15 are connected to the load circuit 12 and in parallel with only a portion of the winding of the autotransformer 27 when only one of the rectifiers 10 and 15 is connected to the load circuit 12. For automatically changing the connections of the overcurrent relay 26, I provide a control relay 29 which is controlled by the positions of the circuit breakers 18 and 20 so that it connects the overcurrent relay in parallel with the entire winding of the autotransformer 27 when both of the circuit breakers 18 and 20 are closed and in parallel with only a portion of the autotransformer winding when either or both of the circuit breakers 18 and 20 are opened. In the particular arrangement shown in the drawing the overcurrent relay 26 is connected in parallel with half of the autotransformer winding when one or both of the rectifiers are disconnected from the load circuit 12. With such an arrangement, the amount of current through the overcurrent relay 26 for any given current through the primary winding 2, when both of the circuit breakers 18 and 20 are closed, is half the amount that flows through the winding of the overcurrent relay for the same current through the primary winding 2 when only one of the circuit breakers 18 and 20 is closed.

The operation of the embodiment of my invention shown in the drawing is as follows:

With both of the rectifiers 10 and 15 in service and normal load conditions on the load circuit 12, the various control devices are in the positions in which they are shown in the drawing. The overcurrent relay 26 is connected in parallel with the entire winding of the autotransformer 27 by the contacts 30 of the control relay 29 which is de-energized. When the load connected to the circuit 12 increases above a predetermined value, the amount of current flowing through the primary winding 2 increases to such a value that the overcurrent relay 26 becomes sufficiently energized to close its contacts 31 and complete through contacts 32 of the circuit breaker 6 an energizing circuit for the trip coil 7 so that circuit breaker 6 opens. By closing its auxiliary contacts 33 and 34, the circuit breaker 6 completes energizing circuits for the trip coils 21 and 22 respectively so that the circuit breakers 18 and 20 are opened to disconnect the rectifiers 10 and 15 from the load circuit 12.

It will now be assumed that, while both the rectifiers 10 and 15 are in service, one of them, such for example as rectifier 10, arcs back while the power transformer 1 is adjusted to supply a relatively low voltage to the rectifiers so that the amount of current supplied to the primary winding 2 under this faulty condition of the rectifier 10 is not sufficient to effect the operation of the overcurrent relay 26 when it is connected in parallel with the entire winding of the autotransformer 27. The arc-back in the rectifier 10, however, causes reverse current to flow from the load circuit to the faulty rectifier 10 so that the reverse current relay 23 closes its contacts 36 and completes, through auxiliary contacts 37 on the circuit breaker 18, an energizing circuit for the trip coil 21 to effect the opening of the circuit breaker 18. By closing its contacts 38, the circuit breaker 18 completes through contacts 39 of the circuit breaker 6 an energizing circuit for the control relay 29 which in turn, by opening its contacts 30 and closing its contacts 40, transfers the connections of the overcurrent relay 26 so that it is now connected in parallel with only a portion of the winding of the autotransformer 27. Since this change in the connections of the overcurrent relay 26 results in it receiving a much greater current for any given value of current in the primary winding 2, the relay 26 is now sufficiently energized to effect the closing of its contacts 31 so that the trip coil 7 is energized to open the circuit breaker 6 and thereby disconnect both rectifiers from the supply circuit 5. It will be apparent also that if either of the rectifiers 10 and 15 is taken out of service, in which case its associated direct current breaker is open while the circuit breaker 6 is closed, the relay 29 is energized through auxiliary contacts on the open breaker to re-calibrate the overcurrent relay 26.

While I have, in accordance with the patent statutes, shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States is:

1. In combination, a supply circuit, a load circuit, a plurality of parallel connected translating devices interconnecting said circuits, means for disconnecting a device from said load circuit, an electroresponsive device having a winding connected to said supply circuit, and means for controlling the connections between said winding and supply circuit in accordance with the number of devices connected to said load circuit to vary the ratio between the currents in said winding and supply circuit.

2. In combination, a supply circuit, a load circuit, a plurality of parallel connected translating devices interconnecting said circuits, means for disconnecting a device from said load circuit; an electroresponsive device having a winding connected to said supply circuit, and means for varying the connections of said winding in response to a disconnection of a translating device from said load circuit so that the amount of supply circuit current required to effect the operation of said electroresponsive device varies directly with the number of translating devices connected to said load circuit.

3. In combination, a supply circuit, a load circuit, a plurality of parallel connected translating devices interconnecting said circuits, means for disconnecting a device from said load circuit, an electroresponsive device having a winding, an autotransformer, a current transformer having its primary winding connected in series with said supply circuit and its secondary winding connected to said autotransformer, and means for connecting said winding across different sections of said autotransformer in accordance with the number of translating devices disconnected from said load circuit.

4. In combination, a supply circuit, a load circuit, a plurality of parallel connected translating devices interconnecting said circuits, means for disconnecting a device from said load circuit, a current relay having a winding connected to said supply circuit, means for controlling the connections between said relay winding and supply circuit in accordance with the number of devices connected to said load circuit to vary the ratio between the currents in said relay winding and supply circuit, and means responsive to the operation of said current relay for disconnecting said devices from said supply circuit.

5. In combination, a supply circuit, a load circuit, a plurality of parallel connected translating devices interconnecting said circuits, means for disconnecting a device from said load circuit, a current relay having a winding connected to said supply circuit, means for varying the connections of said current relay winding in response to a disconnection of a device from said load circuit so that the amount of supply circuit current required to effect the operation of said relay varies directly with the number of devices connected to said load circuit, and means responsive to the operation of said current relay for disconnecting said devices from said supply circuit.

6. In combination, a supply circuit, a load circuit, a plurality of parallel connected translating devices interconnecting said circuits, means for disconnecting a device from said load circuit, a current relay having a winding, an autotransformer, a current transformer having its primary winding connected in series with said supply circuit and its secondary winding connected to said autotransformer, means for connecting said relay winding across different sections of said autotransformer in accordance with the number of devices disconnected from said load circuit, and means responsive to the operation of said current relay for disconnecting said devices from said supply circuit.

7. In combination, an alternating current supply circuit, a direct current load circuit, two power rectifiers interconnecting said circuits, means responsive to an arcback in a rectifier for disconnecting the faulty rectifier from said load circuit, an electroresponsive device having a winding, an autotransformer, a current transformer having its primary winding connected in series with said supply circuit and its secondary winding connected to said autotransformer, and means for connecting said winding across one portion of said autotransformer when both of said rectifiers are connected to said load circuit and across a smaller portion of said autotransformer when only one of said rectifiers is connected to said load circuit.

8. In combination, an alternating current supply circuit, a direct current load circuit, two power rectifiers interconnecting said circuits, means responsive to an arcback in a rectifier for disconnecting the faulty rectifier from said load circuit, an electroresponsive device having a winding, an autotransformer, a current transformer having its primary winding connected in series with said supply circuit and its secondary winding connected to said autotransformer, and means for connecting said winding in parallel with the entire autotransformer when both of said rectifiers are connected to said load circuit and in parallel with only half of said autotransformer when only one of said rectifiers is connected to said load circuit.

9. In combination, an alternating current supply circuit, a direct current load circuit, two power rectifiers interconnecting said circuits, means responsive to an arcback in a rectifier for disconnecting the faulty rectifier from said load circuit, a current relay having a winding, an autotransformer, a current transformer having its primary winding connected in series with said supply circuit and its secondary winding connected to said autotransformer, means for connecting said relay winding across one portion of said autotransformer when both of said rectifiers are connected to said load circuit and across a smaller portion of said autotransformer when only one of said rectifiers is connected to said load circuit, and means responsive to the operation of said relay for disconnecting both of said rectifiers from said supply circuit.

10. In combination, an alternating current supply circuit, a direct current load circuit, two power rectifiers interconnecting said circuits, means responsive to an arcback in a rectifier for disconnecting the faulty rectifier from said load circuit, a current relay having a winding, an autotransformer, a current transformer having its primary winding connected in series with said supply circuit and its secondary winding connected to said autotransformer, means for connecting said relay winding in parallel with the entire autotransformer when both of said rectifiers are connected to said load circuit and in parallel with only half of said autotransformer when only one of said rectifiers is connected to said load circuit, and means responsive to the operation of said relay for disconnecting both of said rectifiers from said supply circuit.

11. In combination, a supply circuit, a load circuit, a plurality of parallel connected translating devices interconnecting said circuits, means for disconnecting devices from said load circuit, a circuit breaker connecting said devices to said supply circuit, overcurrent tripping means for said circuit breaker having an operating winding, and means for supplying to said operating winding in response to any given current in said supply circuit a current having a magnitude which depends upon the number of translating devices connected to said load circuit.

HERMAN BANY.